March 11, 1952  J. G. CAPSTAFF  2,588,615
PRINTING ONTO LENTICULAR FILM
Filed June 1, 1946
Fig.1.
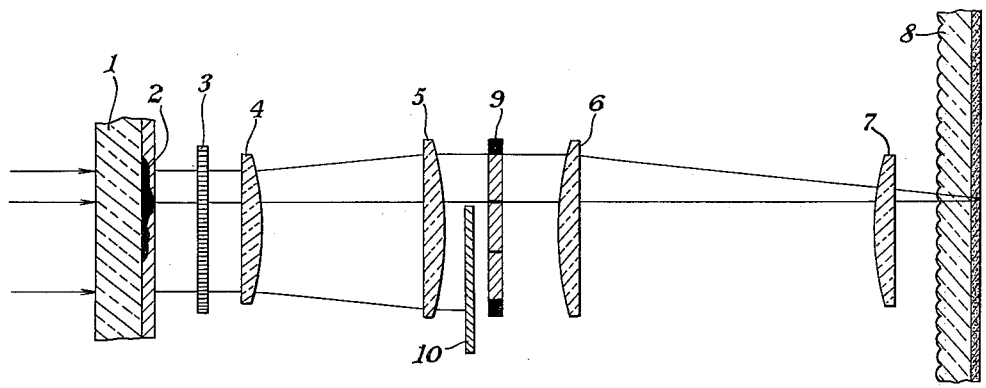
Fig.3.
Fig.2.
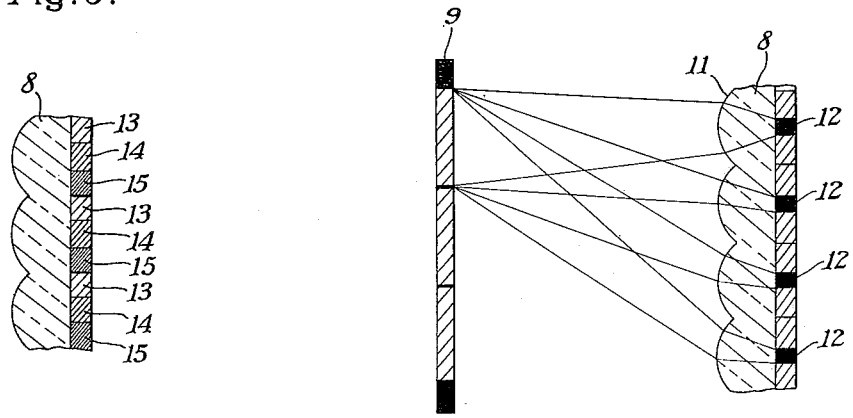
John G. Capstaff
INVENTOR
BY
ATTORNEYS Patented Mar. 11, 1952

2,588,615

UNITED STATES PATENT OFFICE 2,588,615

PRINTING ONTO LENTICULAR FILM

John G. Capstaff, Rochester, N. Y., assignor to Eastman Kodak Company, Rochester, N. Y., a corporation of New Jersey Application June 1, 1946, Serial No. 673,831

1 Claim. (Cl. 95—2)

This invention relates to photography, particularly to a method of printing color separation records onto lenticular film.

It is known that it is sometimes difficult to obtain equal gamma in the images in all layers of a multi-layer integral tripack color material. It is usually desirable for purposes of accurate color reproduction that all images be of equal gamma. In the multi-layer material of Capstaff, Nadeau and Starck U. S. Patent 2,367,665, which is the type of material to which the present invention particularly relates, the three emulsion coatings of the multi-layer film are quite thin and it is not practicable to develop the three images to a predetermined contrast by modifying development conditions in the usual manner nor is it practicable to adjust the relative properties of the coatings so that all three images will have similar contrast or gamma when fully developed. With this type of film, the three images will usually be given full development and there will usually be a difference in the gamma of the three images.

When printing from the negatives formed on this type of film, onto a lenticular print material, an image is first printed from one of the negatives, for example, the blue record image, through an aperture or apertures in the lens system which are in the same relative position as the blue projection filter used for projecting the finished picture. Similarly, on the same lenticular film strip, the green record image is printed in superposition with the subject matter in registry through an aperture or apertures representing the green projection filter and finally the red record image is printed with the subject matter in registry with the two other images through an aperture in the printer system corresponding to the position of the red projection filter. These component images are not, however, in superposition in the emulsion layer but are distinct and separate images side by side. The tricolor filters customarily used in printing lenticular film are not necessary and are not used in my system, although filters are used for other reasons as hereinafter described.

When color separation images are used to print directly onto lenticular print stock, it is important and essential that the black and white silver images produced under each lenticule representing the three colors shall have the same overall gamma in order that correct tone and color reproduction shall result. By "overall gamma" or "apparent gamma," I mean the gamma of the black and white images in the lenticular film, with respect to the intensity scale of the original subject, which may be a color picture or image. If the overall gammas of the three images in the multi-layer material are not the same, it is apparent that the gammas of the three images produced in the lenticular print stock will not be the same and correct color rendition would not be possible. The actual gamma of the black and white images in the lenticular print material might be widely different yet the overall gamma of these images would be the same if some correction were made in the printing operation for the lack of similarity of gamma of the images in the original material.

According to my process the lenticular film emulsion is so constituted as to be capable of producing images of varying contrast. Preferably, I use an emulsion of high resolving power and normally high gamma coated as a single layer and preferably blue and green sensitive. This emulsion contains such an amount of water-soluble light absorbing yellow dye that the emulsion will give a relatively low gamma when printed with blue light. The emulsion may also contain a water-soluble light-absorbing magenta dye to depress the gamma when printed with green light but not to such a low gamma as in the case of the blue light. The dye or dyes are of such nature that they disappear during development.

In the accompanying drawing,

Fig. 1 is a schematic view of the optical arrangement used for printing,

Fig. 2 is an enlarged view showing the path of the light rays onto the lenticular film, and Fig. 3 is an enlarged sectional view of the finished film.

According to my invention, a print is made on lenticular film from a color separation negative or positive using the general optical arrangement illustrated in Fig. 1 of the drawing. If a negative color separation image is used, a positive print will result directly without resorting to the use of a reversal process in the lenticular film emulsion. As shown in Fig. 1, light is passed from a source, not shown, through the color separation image 1 having a negative silver image 2 in its emulsion layer. The light rays pass through a color filter 3, the purpose of which is to control the color of the printing light and thereby the gamma of the image produced in the lenticular film. The filter 3 may be omitted if the gamma requirements are such that white light is to be used in printing, or two or more filters may be used in place of the filter 3 to secure the proper color of printing light. After passing through the filter 3, the light rays pass through the lens system 4, 5, 6 and 7 and the image in the original transparency is thereby imaged on the lenticular film 8, which is a lenticular film having a transparent support, e. g., a cellulosic support and a single emulsion layer. Between the objectives 5 and 6, there is a shutter 9 having a series of apertures corresponding to the apertures of the usual tricolor filter, or more properly to the colors of the tricolor filter which will be used in projecting the lenticular film. The apertures in the shutter 9 may be successively closed or opened by means of a shutter blade represented at 10 so that light may be passed successively through one or another of the apertures in the shutter 9. Thus, if the uppermost opening in the shutter 9 represents the blue section of the projection filter, this portion of the shutter would be open while the blue color separation negative is used for projecting an image onto the lenticular film 8. Similarly, if the central opening of the shutter 9 represents the green portion of the projection filter, this portion would be open during the projection of the green separation negative onto the lenticular film.

The manner in which the rays pass through the upper aperture of the shutter 9 is more fully illustrated in the enlarged diagram, Fig. 2, which shows the rays passing through the uppermost aperture of the shutter onto the lenticular portion 11 of the film 8 and being focused by the lenticules in similar positions behind each lenticule to produce silver images 12 in the emulsion layer of film 8.

It is now apparent that it is possible to produce in the lenticular film any desired gamma throughout the range for which the film is designed. Merely by printing from each component negative through the correct density of minus blue or minus green filter in the case of an emulsion containing yellow and magenta filter dyes, the gamma differences in the color component negatives may be compensated for and a single development of the lenticular film will produce the desired conditions of similar overall gammas for the three separation images. In a single emulsion layer there is produced a composite image made up of three images of different actual gamma in order to correct in the print contrast differences in the original separation images. This condition is illustrated in the sectional view, Fig. 3, which shows the lenticular film 8 having an emulsion layer in which the images 13 have one actual gamma, the images 14 have another actual gamma and the images 15 have still another actual gamma even though the overall gammas of the images may be the same and a correct color picture result.

While I have referred to the use of a material such as that described in Capstaff, Nadeau and Starck, U. S. Patent 2,367,665, for formation of the separation images, it is apparent that other color separation images may be employed in my process. Images produced on any integral tripack material or separations made from them may be used. Also I have referred to the use of a lenticular film emulsion having one or more dyes incorporated therein for the purpose of controlling the gamma of the lenticular film image. This method of controlling gamma is described in an article by Capstaff and Seymour in "Transactions of the Society of Motion Picture Engineers," vol. 10, page 223 (1927). In addition to using an emulsion of this type, it is also possible to use an emulsion which is capable in itself of giving a variation in gamma by the use of different filter combinations, such as that described in Davey and Knott, U. S. Patent 2,318,597.

The lenticular film of my invention may be used for the projection of color pictures in the well-known manner, or for the projection of colored television pictures.

Other modifications in the method of my invention will be apparent to those skilled in the art, and the invention is to be considered as limited only by the scope of the appended claims.

I claim:

The method of reproducing a colored object or image on lenticular film by forming in the lenticular film color separation records having the same apparent gammas as the gammas which the separation images represented by those records have in the colored object or image, which comprises forming a group of color separation records of the original object or image, said records having gammas differing from each other, successively exposing to light controlled by said color separation records a silver halide lenticular film emulsion sensitive to light of wave length shorter than red and containing soluble yellow and magenta dyes and giving lower gamma when exposed with blue light than when exposed with green light, exposing said color separation records with green light to increase the gamma of the record in the lenticular film emulsion when the corresponding color separation record has a lower gamma than the original object or image, and exposing said color separation records with blue light to decrease the gamma of the record in the lenticular film emulsion when the corresponding color separation record has a higher gamma than the original object or image, each exposure being limited to the portions of the fields of the lenticulations corresponding to the color separation record controlling the light, and developing the exposed lenticular film.

JOHN G. CAPSTAFF.

REFERENCES CITED

The following references are of record in the file of this patent:

UNITED STATES PATENTS

| Number | Name | Date |
|---|---|---|
| 1,677,665 | Weaver | July 17, 1928 |
| 1,804,727 | Weaver | May 12, 1931 |
| 1,874,601 | Oswald | Aug. 30, 1932 |
| 1,970,936 | Ives | Aug. 21, 1934 |
| 2,202,026 | Renwick | May 28, 1940 |
| 2,204,074 | Eggert et al. | June 11, 1940 |
| 2,216,004 | Falta et al. | Sept. 24, 1940 |

FOREIGN PATENTS

| Number | Country | Date |
|---|---|---|
| 442,920 | Great Britain | Feb. 18, 1936 |
| 477,236 | Great Britain | Dec. 24, 1937 |